Patented Aug. 17, 1937

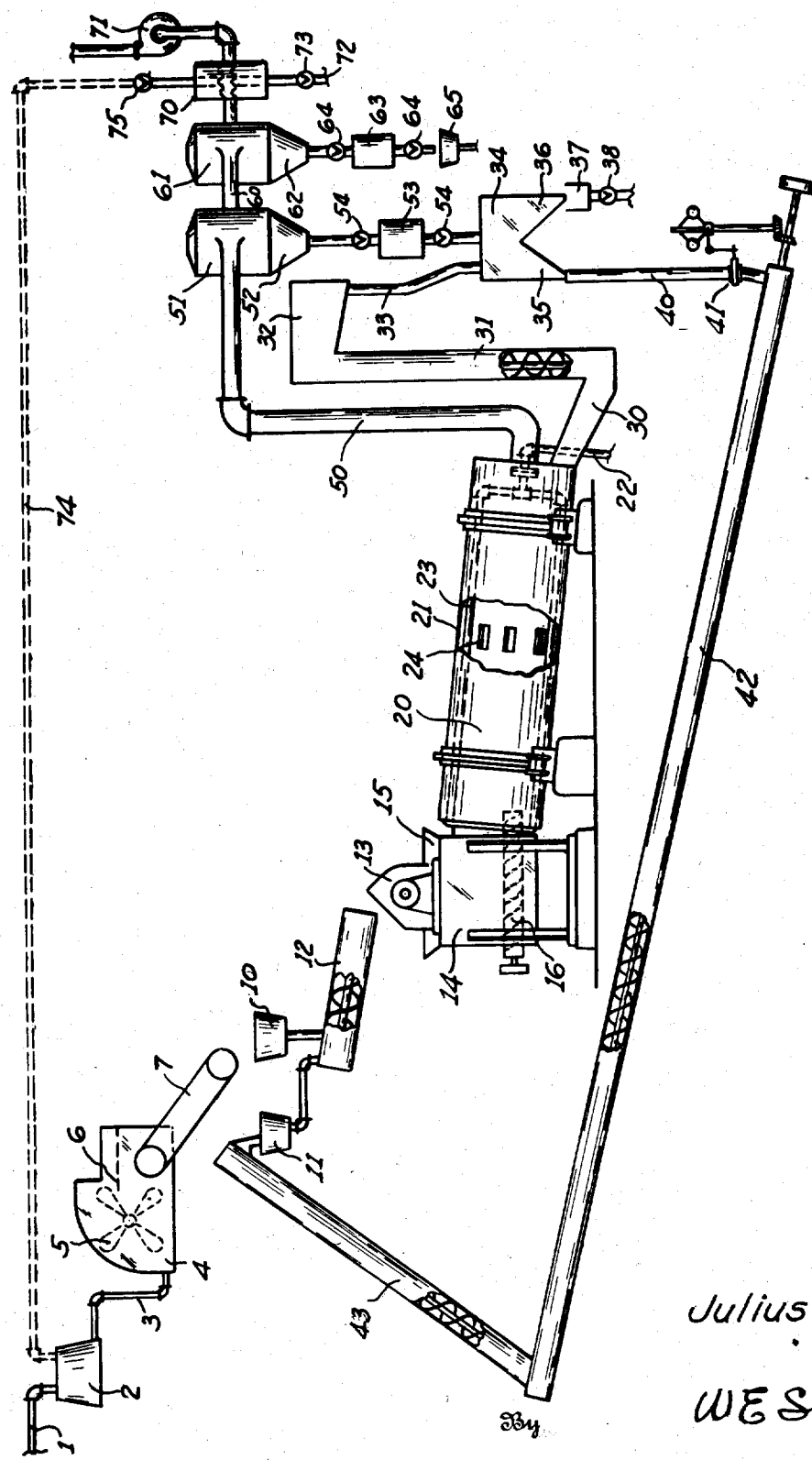

2,090,187

UNITED STATES PATENT OFFICE 2,090,187

MANUFACTURE OF STARCH

Julius Credo, Louisville, Ky., assignor to Louisville Drying Machine Company, Incorporated, Louisville, Ky., a corporation of Kentucky Application August 26, 1935, Serial No. 37,848

8 Claims. (Cl. 34—24)

This invention relates to the manufacture of starch and is equally applicable to the production of a final product known as pearl starch or a final product known as pulverized starch. More particularly, it relates to the drying phases in the manufacture of starch and teaches a method having the desirable characteristics of rapid and efficient drying and the resulting in production of a final product entirely free of gelatinized starch.

Heretofore the chief method of drying starch commercially has been the old established method of drying the same on trays which are slowly pushed through a long tunnel dryer or kiln. The resulting product usually takes the form of lump starch or pearl starch and requires subsequent treatment in order to produce pulverized starch. While this method is widely used it has many disadvantages. A large amount of manual labor is required in practicing the method, the thermal efficiency of the kiln is very low, large factory spaces are required for the long kilns, and the time required for drying the starch ranges from 14 to 18 hours.

In view of these disadvantages various attempts have been made to produce a simpler drying process in the manufacture of starch. However, due to the peculiar characteristics of this substance many difficulties have arisen in the commercial adaptation of such drying processes. A structural change in the starch, known as gelatinization, rapidly takes place whenever there is an incorrect application of heat to starch in the presence of moisture. Such gelatinized starch takes the form of hard granules with an amorphous structure which is insoluble in water and which cannot be changed back into the original form of the starch. Consequently, in applying drying processes used in other arts to the drying of starch this problem of gelatinization has prevented their adoption by this industry.

Based upon the theory that moisture evaporated from the starch as it dries must be taken from the dryer in order to avoid gelatinization, several processes have been developed for drying the starch by means of hot air passing through the dryer simultaneously with the starch. These processes employ dryers in which the heating air travels either concurrent or counter-current to the starch. Usually a plurality of these hot air dryers, in addition to other means for reducing the moisture-content of the starch, are required in order to produce a dry final product. Although these processes have been used, they too have certain inherent disadvantages. The thermal efficiency of such dryers is seldom higher than 35–40% thus requiring a large dryer and a relatively long period of time for drying.

If the hot air travels concurrent with the starch, an extremely long dryer is necessary since the temperature of the drying air is constantly falling as it progresses through the dryer. Moreover, since the temperature of the air is falling at the same time that its moisture-content is rising, its relative humidity is increasing and may rise to the point where it causes gelatinization of the starch before such starch reaches the outlet of the dryer.

If the counter-current type of hot air dryer is used, the air with its maximum temperature and minimum moisture-content meets the starch with its maximum temperature and minimum moisture-content as such starch approaches the outlet end of the dryer. As a result the starch is heated to a high degree causing the formation of large quantities of dust and producing pulverized starch. With such a dryer it is extremely difficult to produce pearl starch. Moreover, in this construction the air with its maximum moisture-content, minimum temperature and high relative humidity meets the starch as it enters the dryer with its maximum moisture-content and minimum temperature and unless a close regulation of heating is provided gelatinization will result. In addition, wet starch has a tendency to cake on the surface of a dryer and if wet starch and moisture laden air meet at the entrance of a dryer there is a likelihood of such caking and subsequent disruption of the drying process.

In order to avoid these inherent disadvantages of the hot air type of dryers, this invention provides an entirely different form of dryer and utilizes a separate source of air to act as a moisture absorbing medium.

The use of heating by radiation from a steam tube dryer has been suggested for the drying of starch refuse, but so far as is known such a dryer has never been used heretofore for the drying of starch per se due to the ever present danger of gelatinization. Due to extensive experimentation I have found that such a dryer is well suited for the drying of starch provided that the method herewith described is followed.

The invention has as an object the teaching of a method of drying starch whereby gelatinization of the starch is prevented.

A second object is the provision of a method of drying starch in a rapid and efficient manner involving a minimum of manual labor.

A further object is the provision of a method of drying starch whereby a final product consisting of pearl or pulverized starch may be obtained at the will of the operator.

Another object is the provision of a method of preventing the caking of damp starch upon the heating surfaces of the dryer.

Other objects and advantages of the invention not at this time particularly enumerated will become apparent as the description proceeds when considered in connection with the accompanying drawing in which, One form of apparatus suitable for carrying out the invention is illustrated.

In this installation an inlet pipe 1 conveys a solution of starch from the conventional starch tables into a reservoir 2. A pipe 3 conveys the starch solution from the reservoir into a vacuum filter 4 which is shown diagrammatically and which may be of any desirable construction. The starch collected upon paddles 5 in this filter is removed therefrom by any suitable means such as a member 6 and is permitted to fall upon a conveyor 7 which transports the wet starch to a hopper 10. This filter cake of starch may contain as much as 48% of water depending upon the efficiency of the vacuum filter. Since starch with such a high percentage of moisture would immediately gelatinize if placed in a high temperature zone, it becomes necessary to lower its moisture content before introducing it into the dryer. This is done in the present process by mixing the wet filter cake in hopper 10 with previously dried starch contained in a second hopper 11 in a manner more completely disclosed hereinafter.

It has been found through experiment that the starch entering the drying zone must not contain more than 30% of moisture, if gelatinization is to be prevented. In order, therefore, to bring the moisture percentage down to this value, the wet and dry starch coming from hoppers 10 and 11 is mixed together in proper proportions by any suitable mixing apparatus such as a pug mill 12. The wet dry mix leaving this mill is adapted to discharge either into a hammer mill 13 opening into the header 14 of the drying apparatus or into an open box 15 which leads air and starch into the same header 14. Box 15 is open to the air at all times and provides the inlet for the air which passes through the dryer concurrent with the starch.

As pointed out hereinafter, the starch from pug mill 12 is directed through the hammer mill 13 whenever a final product known as pulverized starch is desired and is directed into the open box 15 whenever a final product known as pearl starch is desired. Any suitable means (not shown) such as duplicate chutes controlled by a valve may be used to direct the starch from mill 12 into either of hammer mill 13 or box 15.

Starch entering the header 14 falls to the bottom thereof and is moved by a conveyor 16 into the inlet end of a rotary steam tube dryer 20. While this process may be carried out by many types of steam tube dryers it has been found that a dryer such as the type disclosed by Charles E. Geiger in United States Letters Patent 1,139,663 is best suited for this purpose. Such dryer is diagrammatically illustrated herewith and comprises a rotating shell 21 inclined at a small angle and driven by any suitable means. A steam inlet pipe 22 supplies steam through the outlet end of the dryer to a plurality of steam tubes 23 extending lengthwise on the interior of the dryer. These steam tubes radiate heat throughout the length of the dryer and furnish an elongated heating zone of substantially constant temperature. As shown in the broken away view, a series of flights 24 may be provided to assist in showering the material to be dried across the interior of the dryer.

At the outlet or lower end of the dryer 20 a header 30 is provided for the reception of the dried starch. The material collected in this header is conveyed by any suitable means such as a vertical elevator 31 into a hopper 32. From this hopper the material passes through a pipe 33 into a bin 34. Bin 34 is preferably formed with two depending portions 35 and 36 and pipe 33 terminates above portion 35 so that this part of bin 34 will always be filled with dry starch. The portion 36 of bin 34 communicates with an outlet hopper 37 controlled by a valve 38 and forms an outlet for the dried starch which may be led to the packing place.

The dry starch collected in portion 35 of bin 34 passes into a pipe 40 controlled by an automatic regulating valve 41. This valve is designed to feed the required amount of dry starch into conveyor 42 at all times so as to maintain the proper proportions of wet and dry starch and thus insure a moisture content of not more than 30% in the material entering the dryer. Conveyor 42 communicates with a cross conveyor 43 leading into hopper 11. Any suitable means may be provided to regulate the opening of valve 41. One form which such a valve may assume is depicted herewith wherein a governor driven by conveyor 42 acts through a bell crank lever to open or close the valve in proportion to the speed of the conveyor. It will be understood that all conveyors, dryers, mills and moving apparatus may be driven independently by any suitable motive power such as electrical motors which have their individual regulating means. Since a substantially constant supply of wet filter cake having a substantially constant percentage of moisture enters hopper 10 at all times the amount of dry starch required to mix with this wet filter cake may be easily determined. From time to time in the operation of this process the starch leaving dryer 20 is sampled and if it is found that the material contains too much moisture or too little moisture the speed of conveyor 42 can be varied to move a greater or less amount of dry starch into conveyor 43 and thence into hopper 11.

The air entrained in the drying system through inlet 15 carries with it moisture evaporated from the starch and small particles of starch. This air and entrained starch particles is exhausted from dryer 20 through outlet pipe 50 and is directed into separator 51. In this separator a large portion of the entrained starch particles are separated and fall into the bottom 52 of the separator whence they are led into box 53 and later into bin 34. Due to the fact that these particles of dry starch are light and small it is considered advisable to provide duplicate valves 54 on each side of box 53 in order to move the starch from separator 51 into bin 34. In so doing the lower valve 54 would be closed and upper valve 54 opened until box 53 was filled. Then upper valve 54 would be closed and lower valve 54 opened until box 53 was emptied.

In the event that all of the starch entrained in the exhaust cannot be extracted in separator 51, a second separator 61 connected to the first separator by pipe 60 may be provided. In this second separator the starch dust may be collected in bottom 62 and withdrawn into box 63 controlled by valves 64 in the manner above outlined. From box 63 the light, dry starch may be placed in a hopper 65 and taken to the place for packing.

The exhaust air leaving separator 61 may be led into a washing apparatus 70 diagrammatically shown herewith. The exhaust fan 71 then forces the washed exhaust air out of the system. The water used for washing the exhaust may be supplied through a pipe 72 controlled by valve 73 and since a certain amount of starch dust is found even at this stage of the process this water and the starch washed out of the exhaust air is conducted by pipe 74 controlled by valve 75 back into the reservoir 2 containing the starch solution.

It will be obvious to those skilled in the art that various modifications, substitutions and omissions of these various pieces of apparatus may be employed in this process without departing from the invention.

In practice the method of drying the starch is as follows.

The filter cake of starch entering mill 12 and containing approximately 45-48% of moisture is mixed with a predetermined amount of previously dried starch of approximately 7.5-12% moisture in mill 12 and emerges from the mill with approximately 22-26% moisture-content. Assuming that pearl starch is desired as a final product, this wet-dry mix falls into box 15 and passes in contact with the entrained air into dryer 20. At this point it will be noted that the starch has its minimum temperature and maximum moisture-content while the air has its minimum temperature and minimum moisture-content. Consequently, the air is capable of readily absorbing the moisture given off by the starch as it dries and as the air is heated in passing through the dryer this moisture-absorbing capacity is increased. Furthermore, the relatively cool temperature of the air entering the dryer helps to lower the temperature of the starch at the beginning of the drying stage and thus lowers the danger of gelatinization. In one installation where this process has proven successful, the temperature of the starch entering the dryer was 118° F. and leaving the dryer was 160° F. At the same time the temperature of the air entering the dryer was 90° F. and leaving the dryer was 180° F. with a relative humidity of 25%.

Since the material to be dried and the moisture absorbing medium move concurrently through the separately heated drying zone, it is apparent that there is a continuous transfer of the products of evaporation from the starch to the air. Since the process is continuous, these products of evaporation are constantly being removed from the presence of the dry starch and so long as the relative humidity of the exhaust air does not exceed 30% the starch does not gelatinize.

If pulverized starch is desired, the mixture coming from mill 12 is directed through hammer mill 13 which forms small particles of starch susceptible to ready drying. It has been found that these small particles when leaving the dryer 20 may have a moisture-content of as low as 3-4% and be in the form of commercial pulverized starch without requiring subsequent treatment.

In this process the tendency of the damp starch to cake upon the surfaces of the dryer is greatly reduced since the damp starch is entrained in a current of dry air as it enters the dryer. The movement of the inclined rotary dryer 20 plus the suction of fan 71 pulling air through the system provide a constant movement between the dry air and the damp starch as they start through the dryer and prevent the starch from collecting upon the dryer surfaces. It follows, therefore, that through the use of this process a more efficient dryer can be used, the time of drying is shortened materially and a closer regulation of drying with a more uniform product can be obtained.

Having thus disclosed my invention, I claim:

1. The method of drying starch comprising, passing starch having a moisture-content of less than 30% through a separately heated zone of substantially constant temperature, transferring the moisture evaporated from the starch to an absorbing medium travelling concurrently in contact with the starch and raising the relative humidity of the same to a value not exceeding 30%, progressively reducing the moisture-content of the starch and increasing the temperature of the starch in the presence of the moisture absorbing medium and finally separating the resulting hot, low moisture-content starch from the resulting hot, high moisture-content absorbing medium.

2. The method of inhibiting gelatinization in the rapid drying of starch comprising, passing starch having a moisture-content of less than 30% through a separately heated zone of substantially constant temperature, concurrently passing a relatively dry moisture absorbing medium through the heating zone in contact with the starch, agitating the starch during its passage through the heating zone in order to bring the same into intimate contact with the absorbing medium to provide a rapid drying without gelatinization, progressively reducing the moisture-content of the starch and increasing the temperature of the starch while transferring the products of evaporation to the moisture absorbing medium and increasing the relative humidity of the same to a value not exceeding 30% and finally separating the resulting hot, low moisture-content starch from the resulting hot, high moisture-content absorbing medium.

3. The method of inhibiting caking of starch on surfaces of a dryer during the drying process comprising, mixing previously dried starch with the damp starch to reduce the moisture-content of the mixture to less than 30%, showering the mixture through a separately heated zone of substantially constant temperature in contact with a moisture absorbing medium moving concurrently with the starch, progressively increasing the temperature and decreasing the moisture-content of the starch while simultaneously increasing the temperature and increasing the moisture-content of the medium to a value not exceeding 30% relative humidity and finally separating the resulting hot, low moisture-content starch from the resulting hot, high moisture-content medium.

4. The method of drying starch subject to gelatinization comprising, concurrently passing a moisture absorbing medium through a separately heated zone of substantially uniform temperature in contact with the starch, agitating the starch during its passage through the heated zone in order to bring the same into intimate contact with the absorbing medium to provide a rapid moisture transference without gelatinization of the starch, absorbing the products of evaporation given off by the starch in its agitated movement and raising the relative humidity of the absorbing medium to not more than 30% and finally separating the resulting hot, low moisture-content starch from the resulting hot, high moisture-content absorbing medium.

5. The method of drying starch in contact with a moisture absorbing medium comprising, introducing starch with a moisture-content not exceeding 30% and at a low temperature together with the medium at a low moisture-content and a low temperature concurrently into a separately heated zone of substantially uniform temperature, passing the starch and medium in heat and moisture transfer relation through said heating zone and removing at the same end of the heated zone both the starch with a low moisture-content and a high temperature together with the medium at a moisture-content not exceeding 30% relative humidity and at a high temperature.

6. The method of drying starch to produce pulverized starch comprising, mixing previously dried starch with the damp starch to reduce the moisture-content of the mixture to less than 30%, milling the mixture to form small grains of starch, showering the small grains through a separately heated zone of substantially constant temperature in contact with a moisture absorbing medium moving concurrently with the starch, progressively increasing the temperature and decreasing the moisture-content of the starch while simultaneously increasing the temperature and increasing the moisture-content of the medium to a value not exceeding 30% relative humidity and finally separating the resulting hot, low moisture-content pulverized starch from the resulting hot, high moisture-content medium.

7. The improvement in the art of manufacturing starch comprising, removing starch with approximately 45–48% moisture from filtering apparatus, mixing previously dried starch with approximately 7.5%–12% moisture with the filtered starch to form a mixture with approximately 22–26% moisture, passing the mixture through a separately heated zone of substantially uniform temperature, transferring the moisture evaporated from the mixture to an absorbing medium moving concurrently through the heating zone in contact with the mixture, progressively increasing the temperature of the mixture and reducing its moisture-content as it moves through the heating zone, progressively increasing the temperature of the aborbing medium and increasing its moisture-content to a value not exceeding 30% relative humidity as it moves through the heating zone, separating the dried starch from the absorbing medium as they leave the heating zone, utilizing a part of the dried starch for mixing with damp filtered starch and leading the remainder of the dried starch to an outlet from the system.

8. The improvement in the art of manufacturing pulverized starch comprising, removing starch with approximately 45–48% moisture from filtering apparatus, mixing previously dried starch with approximately 7.5%–12% moisture with the filtered starch to form a mixture with approximately 22–26% moisture, milling the mixture to form small grains of starch susceptible to ready drying into a pulverized form, passing the mixture through a separately heated zone of substantially uniform temperature, transferring the moisture evaporated from the mixture to an absorbing medium moving concurrently through the heating zone in contact with the mixture, progressively increasing the temperature of the mixture and reducing its moisture-content as it moves through the heating zone, progressively increasing the temperature of the absorbing medium and increasing its moisture-content to a value not exceeding 30% relative humidity as it moves through the heating zone, separating the dried starch from the absorbing medium as they leave the heating zone, utilizing a part of the dried starch for mixing with damp filtered starch and leading the remainder of the dried starch to an outlet from the system.

JULIUS CREDO.

CERTIFICATE OF CORRECTION.

Patent No. 2,090,187.   August 17, 1937.

JULIUS CREDO.

It is hereby certified that the name of the assignee in the above numbered patent was erroneously described and specified as "Louisville Drying Machine Company, Incorporated" whereas said name should have been described and specified as Louisville Drying Machinery Company, Incorporated, of Louisville, Kentucky, a corporation of Kentucky; as shown by the records of assignments in this office; and that the said Letters Patent should be read with this correction therein that the same may conform to the record of the case in the Patent Office.

Signed and sealed this 12th day of October, A. D. 1937.

Henry Van Arsdale.
Acting Commissioner of Patents.

(Seal)

5. The method of drying starch in contact with a moisture absorbing medium comprising, introducing starch with a moisture-content not exceeding 30% and at a low temperature together with the medium at a low moisture-content and a low temperature concurrently into a separately heated zone of substantially uniform temperature, passing the starch and medium in heat and moisture transfer relation through said heating zone and removing at the same end of the heated zone both the starch with a low moisture-content and a high temperature together with the medium at a moisture-content not exceeding 30% relative humidity and at a high temperature.

6. The method of drying starch to produce pulverized starch comprising, mixing previously dried starch with the damp starch to reduce the moisture-content of the mixture to less than 30%, milling the mixture to form small grains of starch, showering the small grains through a separately heated zone of substantially constant temperature in contact with a moisture absorbing medium moving concurrently with the starch, progressively increasing the temperature and decreasing the moisture-content of the starch while simultaneously increasing the temperature and increasing the moisture-content of the medium to a value not exceeding 30% relative humidity and finally separating the resulting hot, low moisture-content pulverized starch from the resulting hot, high moisture-content medium.

7. The improvement in the art of manufacturing starch comprising, removing starch with approximately 45-48% moisture from filtering apparatus, mixing previously dried starch with approximately 7.5%-12% moisture with the filtered starch to form a mixture with approximately 22-26% moisture, passing the mixture through a separately heated zone of substantially uniform temperature, transferring the moisture evaporated from the mixture to an absorbing medium moving concurrently through the heating zone in contact with the mixture, progressively increasing the temperature of the mixture and reducing its moisture-content as it moves through the heating zone, progressively increasing the temperature of the aborbing medium and increasing its moisture-content to a value not exceeding 30% relative humidity as it moves through the heating zone, separating the dried starch from the absorbing medium as they leave the heating zone, utilizing a part of the dried starch for mixing with damp filtered starch and leading the remainder of the dried starch to an outlet from the system.

8. The improvement in the art of manufacturing pulverized starch comprising, removing starch with approximately 45-48% moisture from filtering apparatus, mixing previously dried starch with approximately 7.5%-12% moisture with the filtered starch to form a mixture with approximately 22-26% moisture, milling the mixture to form small grains of starch susceptible to ready drying into a pulverized form, passing the mixture through a separately heated zone of substantially uniform temperature, transferring the moisture evaporated from the mixture to an absorbing medium moving concurrently through the heating zone in contact with the mixture, progressively increasing the temperature of the mixture and reducing its moisture-content as it moves through the heating zone, progressively increasing the temperature of the absorbing medium and increasing its moisture-content to a value not exceeding 30% relative humidity as it moves through the heating zone, separating the dried starch from the absorbing medium as they leave the heating zone, utilizing a part of the dried starch for mixing with damp filtered starch and leading the remainder of the dried starch to an outlet from the system.

JULIUS CREDO.

CERTIFICATE OF CORRECTION.

Patent No. 2,090,187.　　　　　　　　　　　August 17, 1937.

JULIUS CREDO.

It is hereby certified that the name of the assignee in the above numbered patent was erroneously described and specified as "Louisville Drying Machine Company, Incorporated" whereas said name should have been described and specified as Louisville Drying Machinery Company, Incorporated, of Louisville, Kentucky, a corporation of Kentucky; as shown by the records of assignments in this office; and that the said Letters Patent should be read with this correction therein that the same may conform to the record of the case in the Patent Office.

Signed and sealed this 12th day of October, A. D. 1937.

Henry Van Arsdale.
Acting Commissioner of Patents.

(Seal)

CERTIFICATE OF CORRECTION.

Patent No. 2,090,187.  August 17, 1937.

JULIUS CREDO.

It is hereby certified that the name of the assignee in the above numbered patent was erroneously described and specified as "Louisville Drying Machine Company, Incorporated" whereas said name should have been described and specified as Louisville Drying Machinery Company, Incorporated, of Louisville, Kentucky, a corporation of Kentucky; as shown by the records of assignments in this office; and that the said Letters Patent should be read with this correction therein that the same may conform to the record of the case in the Patent Office.

Signed and sealed this 12th day of October, A. D. 1937.

(Seal)

Henry Van Arsdale.
Acting Commissioner of Patents.